Figure 1:
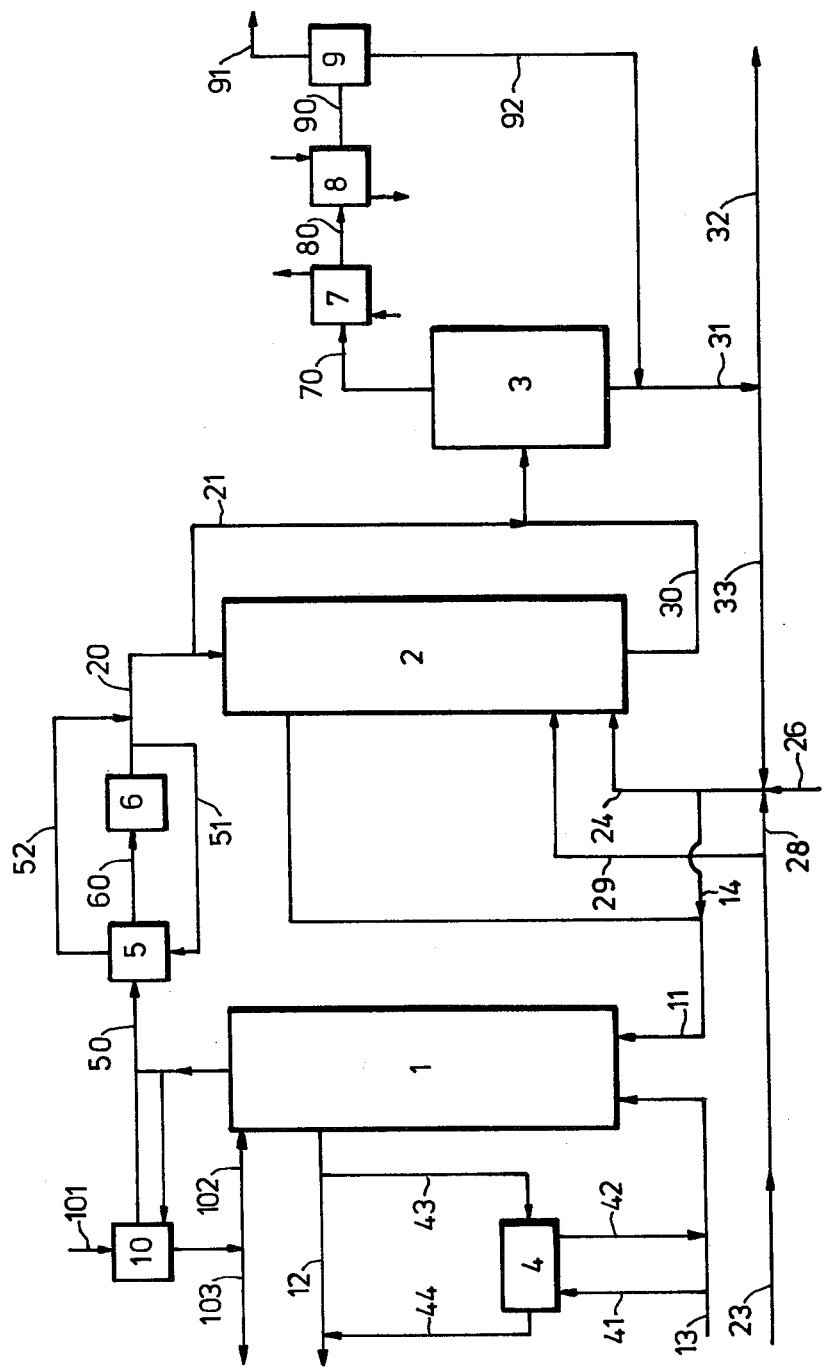

United States Patent [19]

Thiel et al.

[11] 4,141,829

[45] Feb. 27, 1979

[54] PROCESS FOR WET OXIDATION OF ORGANIC SUBSTANCES

[75] Inventors: Reinhard Thiel; Karl-Heinz Dietz; Hans Kerres; Heinz J. Rosenbaum; Siegfried Steiner, all of Krefeld, Fed. Rep. of Germany

[73] Assignee: Bayer Aktiengesellschaft, Leverkusen, Fed. Rep. of Germany

[21] Appl. No.: 830,295

[22] Filed: Sep. 2, 1977

[30] Foreign Application Priority Data

Sep. 9, 1976 [DE] Fed. Rep. of Germany ....... 2640603

[51] Int. Cl.² .............................................. C02C 5/04
[52] U.S. Cl. .................................... 210/63 R; 210/71
[58] Field of Search ................................ 210/63 R, 71

[56] References Cited

U.S. PATENT DOCUMENTS

| | | | |
|---|---|---|---|
| 3,054,653 | 9/1962 | Barton | 210/63 R |
| 3,649,534 | 3/1972 | Schotte | 210/71 |
| 3,661,778 | 5/1972 | Prodt | 210/71 |
| 3,697,417 | 10/1972 | Teletzke | 210/63 R |
| 3,835,048 | 9/1974 | Walter | 210/63 R |
| 3,876,497 | 4/1975 | Hoffman | 210/63 R |
| 3,920,506 | 11/1975 | Morgan | 210/71 |
| 3,920,548 | 11/1975 | Fassell | 210/63 R |
| 3,944,396 | 7/1960 | Barton | 210/63 R |
| 4,013,560 | 3/1977 | Paadt | 210/63 R |

FOREIGN PATENT DOCUMENTS

539300 4/1957 Canada .................. 210/63 R

Primary Examiner—Frank A. Spear, Jr.
Assistant Examiner—Ernest G. Therkorn
Attorney, Agent, or Firm—Sprung, Felfe, Horn, Lynch & Kramer

[57] ABSTRACT

A process has been developed for the oxidation of organic substances, dissolved or dispersed in an aqueous system, with a gas containing molecular oxygen at elevated temperature and under elevated pressure chiefly to carbon dioxide and water, with subsequent phase separation of the reaction mixture into a gaseous phase substantially containing inert gas, carbon dioxide, steam and organic constituents and a liquid phase substantially containing water, characterized in that the pressure is adjusted, at the given temperature, so that by evaporation of water from the aqueous system, more steam than the exothermicity of the oxidation reaction gives rise to, goes into the gaseous phase, which is fed to a heat exchanger in which the amount of heat required to maintain the oxidation temperature is completely or partially transferred to a mixture of water and a gas containing molecular oxygen, which mixture flows in on the other side of the heat exchanger and is subsequently fed to the reactor.

A particular advantage of the process of the invention is that, in addition to the oxidation of organic substances, it is possible to feed inorganic constituents, after the oxidative degradation of the organic substances, to a re-use or recovery process.

13 Claims, 1 Drawing Figure

PROCESS FOR WET OXIDATION OF ORGANIC SUBSTANCES

The present invention relates to a process for the oxidation of organic substances, dissolved or dispersed in an aqueous system, to carbon dioxide and water.

This process, which is already known in general under the name wet oxidation, is an elegant and thus repeatedly proposed method for purifying effluents which are contaminated with organic substances (compare U. Lohmann and A. Tilly, Chemie-Ing.-Technik 37 (1965), 913-916). For this purpose, the effluent is treated with molecular oxygen at elevated temperature and under elevated pressure, the organic compounds being oxidised chiefly to carbon dioxide and water. In general, this combustion in the liquid phase is carried out at temperatures above 200° C. since the rate of reaction is too low at lower temperatures.

These temperatures simultaneously necessitate the use of elevated pressure of, in particular, more than 20 bars, in order to prevent the water from evaporating.

However, in this procedure it cannot be avoided that the off-gas, in accordance with the temperature and pressure conditions, becomes saturated with steam so that in the course of the reaction the reaction solution continuously becomes more concentrated, whereupon dissolved salts precipitate and can lead to blockages. Simultaneously, a considerable amount of energy, which is taken from the reactor, is required for the evaporation.

In order to suppress these undesired consequences of the evaporation of water from the reaction solution, the total pressure during the wet oxidation is usually chosen so high that it is considerably above the vapour pressure of water.

Such a process is also described, for example, in Wasserwirtschaft-Wassertechnik 18 (1968), page 342-346.

In this process, for example, the oxidation reaction is carried out under the conditions, which are typical for the procedure used hitherto, of 274° C. and 120 bars. In detail, the effluent which is contaminated with organic substances is pumped, by means of a high pressure pump, through a heat exchanger into the reactor. It is already mixed with compressed air upstream of the heat exchanger, whereby the absorption of energy in this heat exchanger can be increased by additional evaporation. The warmed mixture enters the reactor, which is equipped with stirrers or baffles for effective thorough mixing, from below.

The reactor is operated flooded, that is to say at the head gas and liquid are together passed back via a pipeline into the heat exchanger, where they give up the majority of their heat energy, in countercurrent, to the product running in. Downstream of this heat exchanger is a separating vessel in which the gas and liquid are separated. Both streams are let down separately, if appropriate after further utilisation of the energy.

However, this process has several disadvantages. Thus, for example, the improved absorption of energy in the heat exchanger upstream of the reactor, resulting from passing in air and effluent together, cannot always be fully utilised: on the one hand salts contained in the effluent are troublesome when their solubility limits are exceeded because they form a crust on the heat exchanger surfaces, and on the other hand the organic compounds contained in the effluent can lead to resin formation and deposits, after partial oxidation, already in the heat exchanger. Furthermore, there still exists the known disadvantage that the process described must be carried out significantly above the partial pressure of the reaction solution in order to avoid too great an evaporation of the water and thus a concentrating of the solution.

The table which follows gives an idea of the influence of the pressure on the amount of stream in the off-gas at a fixed temperature. The amount of off-gas (without water) was 1,000 $m^3_n$/hour (pure nitrogen). For reasons of simplicity, the amounts of steam corresponding to the partial vapour pressure of water have been calculated for ideal conditions because the dependencies are more complex under wet oxidation conditions since a marked mutual interaction of the steam with other gases, such as nitrogen, oxygen, carbon dioxide and organic compounds, occurs.

| Temperature °C | Partial pressure of steam bars | Total pressure bars | Steam kg/hr |
|---|---|---|---|
| 200 | 15.55 | 100 | 148 |
| 200 | 15.55 | 70 | 229 |
| 200 | 15.55 | 40 | 511 |
| 200 | 15.55 | 30 | 865 |
| 200 | 15.55 | 25 | 1,322 |
| 200 | 15.55 | 20 | 2,809 |
| 200 | 15.55 | 18 | 5,102 |
| 200 | 15.55 | 17 | 8,621 |
| 200 | 15.55 | 16 | 27,780 |

As a result of the high pressure necessary for the conventional wet oxidation process, not only must the apparatus thus be designed with thicker walls, but high compression outputs must be produced continuously above all for the oxidation air, in order to maintain the high pressure level.

A process has now been found for the oxidation of organic substances, dissolved or dispersed in an aqueous system, with a gas containing molecular oxygen at elevated temperature and under elevated pressure chiefly to carbon dioxide and water, with subsequent phase separation of the reaction mixture into a gaseous phase substantially containing inert gas, carbon dioxide, steam and organic constituents and a liquid phase substantially containing water, which is characterised in that the pressure is adjusted, at the given temperature, so that by evaporation of water from the aqueous system, more steam than the exothermicity of the oxidation reaction gives rise to, goes into the gaseous phase, which is fed to a heat exchanger in which the amount of heat required to maintain the oxidation temperature is completely or partially transferred to a mixture of water and a gas containing molecular oxygen, which mixture flows in on the other side of the heat exchanger and is subsequently fed to the reactor.

The disadvantages mentioned can accordingly be avoided and, in addition, the conversion and rate of reaction even increased when the recycling of heat into the reactor is not achieved by the mixture of already oxidized solution and off-gas giving its heat to the untreated solution, but when a phase separation is initially carried out after the reaction and the heat content of the salt-free pure off-gas stream is transferred, in a heat exchanger, to a mixture of water and fresh air which is recycled to the reactor.

In the literature (for example G. H. Teletzke, Chem. Engng. Progress 60, (1964), page 33-38; and Wilhelmi and Ely, Chem. Engng. 83 (1976) page 105-109) it has already been shown by a number of examples that the most diverse organic constituents in aqueous solution can be degraded by wet oxidation to carbon dioxide and water.

Effluents which contain organic compounds, of virtually any desired composition, in the dissolved, emulsified or suspended form can also be purified by the process according to the invention. The organic compounds can be both low-molecular and higher-molecular substances or mixtures there of. In contrast to aerobic biological degradation, virtually all organic constituents can be converted by wet oxidation, significant differences resulting, in some cases, only in the rate of reaction.

In addition to organic substances, the aqueous solutions can also contain inorganic compounds, such as mineral acids, salts, hydroxides or oxides, in the dissolved or suspended form. If these are not compounds which are volatile under the reaction conditions, they can not naturally be removed by a process according to the invention; however, a chemical conversion can take place, for example by the formation of carbonate from hydroxides or by oxidation, for example of sulphites to sulphates. Thus, in many cases it is to be regarded as a particular advantage of the process that the inorganic constituents can be fed, after oxidative degradation of the organic substances, to a re-use or recovery process.

Thus, the process according to the invention can be applied to the entire spectrum of communal and industrial effluents for the removal of organic constituents, if appropriate with the recycling of valuable inorganic constituents.

The gas, containing molecular oxygen, used in the oxidation can be molecular oxygen, air or a mixture of nitrogen and oxygen with a larger or smaller proportion of oxygen than that in air. Mixtures of oxygen and other inert gases, for example carbon dioxide, can also be used. As a rule, when the process is carried out industrially it is preferable to use air for economical reasons. The amount of oxygen-containing gas should correspond to at least the stoichiometric ratio required for the conversion of the organic constituents into their oxidation products, chiefly carbon dioxide and water. For economical reasons it is appropriate to employ about 100–125% of the stoichiometric amount.

The wet oxidation process can be carried out in the form of many variants in a temperature range from about 150°–370° C., temperatures of about 150° C. being used for a catalysed partial oxidation in the liquid phase and temperatures of up to about 370° C. being used for an uncatalysed total oxidation. If it is considered important to achieve an oxidation of the organic constituents contained in the inlet as complete as possible, in an economical manner, it is appropriate to use reaction temperatures of about 220°–350° C. Preferred temperatures within this range are dependent, in particular, on the nature and concentration of the constituents as well as optional catalytically active additives. Catalytically active compounds which may be mentioned are, for example, compounds of the elements Cu, Mn, Ag, Zn, Ni and Cr. When the process is carried out industrially, in general those temperatures are chosen at which the desired conversion is achieved within 2 hours at the most, in order to avoid excessively large equipment.

The pressure to be applied when carrying out the wet oxidation is initially determined by the appropriately chosen reaction temperature or by the partial pressure of water vapour ($P_w$) respectively, corresponding to this temperature, of the reaction solution. The reaction pressure ($P_T$) must naturally be higher than the particular $P_w$ value in order to prevent a complete evaporation of the water.

The use of a low total pressure $P_T$, in order to overcome the disadvantages of known methods, and at the same time, as has been found, surprisingly, to achieve higher conversions with short residence times is characteristic of the process according to the invention. The value of $P_T$ is to be chosen such that more evaporated water than the heat of reaction gives rise to is led off with the gas stream issuing from the reaction after partial or complete conversion of the oxygen fed in.

In general, the heat of reaction corresponds, in the case of complete conversion, to the heat of combustion under the reaction conditions of all the organic constituents fed to the reaction. These values can be taken from the literature or approximately estimated or experimentally determined. The exothermicity which may occur in the chemical conversion of inorganic constituents, can as a rule be disregarded as being insignificant. The minimum amount of stream which is to be led off, according to the invention, with the gas stream, can be determined from the heat of reaction via the heat of evaporation of the water which applies to the particular reaction temperature. From the knowledge of the amount of gas used for the reaction and the partial pressure of water vapour $P_w$ which depends on the reaction temperature, it is easy for those skilled in the art to calculate the total pressure $P_T$ required to lead off, from the reactor, a desired amount of steam with the off-gas. The pressure $P_T$ required in the reactor is controlled by means of a valve in the off-gas line.

It is advantageous to lower the pressure $P_T$ to such an extent that significantly more steam than the heat of reaction gives rise to is drawn off from the reaction system with the off-gas stream. An upper limit is given solely for economic reasons because the required exchange surface of the downstream heat exchanger also rises with an increasing amount of steam. In general, if air is used as the preferred oxidation gas the heat content of the steam in the off-gas stream is about 130–400% of the excess heat of reaction. In the case of solutions with low contamination or in the case of a low reaction temperature, it can be economically appropriate even to exceed the above value and to lead off, with the off-gas, up to 800% of the amount of steam which the heat of reaction gives rise to.

If no additional heat is supplied to the reactor from outside, the non-transferred amount of heat in the downstream heat-exchanger and the losses of heat from the various parts of the apparatus, owing, for example, to radiation, should not rise above the amount of heat produced in the reactor. On the other hand it is, in principle, possible, e.g. in the case of effluents with very low degrees of contamination, to supply the reactor with heat externally by using steam heating, electric heating or by means of heat transfer in an additional heat exchanger.

According to the amount of steam to be removed together with the off-gas stream, the pressure in the reactor ($P_T$) should be adjusted so that it is from 1.05 to 1.5 times, in particular from 1.1 to 1.3 times, the partial pressure of steam present at the particular reaction temperature. Thus the off-gas contains approximately 65–95% by volume, in particular approximately 75–90% by volume, of steam.

The off-gas rich in steam is fed to an indirect heat exchanger in which a substantial part of its heat content is transferred to a mixture of water and the oxygen-containing gas to be used for the oxidation. Depending on the amount of water fed in, partial or complete evaporation of the water occurs. The mixture of water in the form of steam and, if appropriate, liquid water as well as the oxidation gas is subsequently passed into the reactor. If no heat is fed to the reactor in another way, for example by external heating or prewarming the solution to be treated, the total amount of heat required to maintain the reaction temperature is to be transferred in the heat exchanger.

The heat exchanger can be of any desired construction, for example a plate heat exchanger or a tube-bundle heat exchanger. Both single-stage and multi-stage heat exchangers can be used. The condensate which is obtained from the off-gas stream in this heat exchanger and in down-stream condensers can preferably be used as the water which is fed, together with the oxidation gas, to the heat exchanger. However, the total amount of the condensate water obtained does not need to be used. On the contrary, it is an advantage of the process that very pure water of condensation is obtained which as a rule, without any subsequent treatment, can be discharged or used as service water in another suitable place. However, the amount of water employed must in every case be large enough, mixed with the oxidation gas, to absorb by evaporation the amount of heat required to maintain the reaction temperature.

On the other hand, as has already been mentioned, it should be ensured that dissolved inorganic salts as far as possible do not separate out in the reactor by the reaction solution becoming more concentrated. Thus in some cases it can be appropriate to recycle a larger amount of water into the liquid-phase oxidation stage than that required for conveying the heat. It is, of course, also possible to feed this additional requirement of water back into the reactor, by-passing the heat exchanger, or to feed it as fresh water. If it is decided to pass a larger amount of water through the heat exchanger than is necessary for conveying the heat, the amount of heat which must be recycled into the reactor to maintain the reaction temperature at the predetermined pressure is controlled by leading past the heat exchanger a certain part stream of the off-gas, which is rich in steam, streaming out of the reactor. In this procedure, the amount of part stream is regulated according to the reactor temperature.

The process according to the invention can be particularly advantageously carried out when the off-gas stream rich in stream is subjected to a catalytic after-oxidation in a further process stage. As is known, not all organic substances are equally readily degraded under wet oxidation conditions. Thus, for example, acetic acid is formed by oxidative degradation of the most diverse organic compounds and becomes more concentrated as a result of its relative stability towards oxidative degradation (compare DOS (German Published Specification) No. 2,445,391). About 5–10% of the carbon content originally present are usually converted into acetic acid, the formation of which alone prevents, in the processes known hitherto, a quantitative conversion within reasonable residence times. Thus, compounds which are difficult to degrade become increasingly more highly concentrated in effluent solutions which are to be recycled. On the other hand, even substances which are difficult to oxidise an rapidly degraded by the process according to the invention combined with a catalytic after-combustion, so that higher rates of reaction and significantly higher total conversions result.

The oxidative catalytic treatment of off-gas is a process, which is in itself known, for purifying an off-gas from organic constituents. High volume concentrations, such as precisely those which are present under high-pressure conditions, and high temperatures, such as are customary for the wet oxidation process, favour a quantitative conversion.

For the catalytic after-oxidation, the off-gas stream is passed, according to the invention, before entry into the heat exchanger, over solid catalysts which appropriately contain metal oxides or noble metals. Metal oxides which can be employed are the known oxides which are used for reactions in the normal pressure range, for example the oxides of iron, cobalt and nickel, of copper, zinc, cadmium, titanium, vanadium, chromium, molybdenum, manganese and cerium as the pure oxides or as anions, such as, for example, as chromates, chromites, ferrates, molybdates and aluminates. Amongst the noble metals, as is known, in particular the elements of sub-group VIII of the periodic system are suitable, such as ruthenium, rhodium, palladium, osmium, iridium and platinum in the form of supported catalysts.

Palladium and platinum have proved to be particularly suitable for the process according to the invention.

Supports which can be used are, for example, aluminium oxide, corundum, alumina, porcelain, silicas, natural or synthetic silicates, quartz or titanium dioxide. Support materials containing $\gamma$-aluminium oxide or lithium/aluminium/spinel are particularly suitable particularly as supports for palladium or platinum. Lithium/aluminium/spinel supports which are suitable are, for example, those with a 50–100% lithium/aluminium/spinel content. The preparation of such supports is described, for example, in DOS (German Published Specification) No. 2,436,368. Within the scope of the use according to the invention, the catalysts are distinguished by the fact that they have a long life and effect almost complete removal of the organic compounds, that is to say the content of organic compounds in the gas after the catalytic oxidative treatment is extremely low. Further characteristics of the process according to the invention are a very low carbon monoxide content in the off-gas, the absence of nitrogen oxides in the off-gas, a low start temperature and high stability towards changes in the composition and the contact time of the gas employed. The catalysts are not sensitive towards steam. The proportion of steam in the off-gas can be up to about 95% by volume. Customary steam contents in the off-gas are about 65 to 90% by volume, preferably about 75 to 90% by volume. For the catalytic oxidation, for example, commercially available contact catalysts based on aluminium oxide or lithium/aluminium/spinel having an internal surface area (measured by the BET method) of, for example, 20–500 m$^2$/g can be employed.

The finished support can have dimensions of 3–10 mm, for example in the form of pellets or beads, extrudates or in other forms. The noble metal can be contained on the support in amounts of about 0.1–100 g/l for example about 1–30 g/l, of catalyst. The preparation of the catalysts is carried out in a generally known manner. The contact catalysts described exhibit a high activity under elevated pressure. Pressures of about 5 to 235 bars, preferably of about 20 to 210 bars, are suitable. In general, the reaction temperatures are about 200° to 500° C., in particular in the range from about 260° to 450° C. In general, the residence time is about 0.1 to 1 second. Starting gases which can be used are off-gases, such as are obtained within the scope of the wet oxidation process according to the invention, with a content of organic compounds of about 0.001 to 10% by weight. In particular, off-gases which contain about 0.01 to 1.0% by weight of organic compounds are treated.

The amount of molecular oxygen which is passed, together with the off-gas, over the solid catalyst depends, of course, on the amount of organic constituents contained in the off-gas which are to be converted into $CO_2$ and water. The addition of oxygen must accordingly take place in at least the stoichiometric amount, relative to the oxygen required for the conversion of the organic constituents into $CO_2$ and water. In general, in the process according to the invention the oxygen necessary for the catalytic gas-phase reaction is already added to the reactor for the liquid phase oxidation. In this manner, the rate of reaction can be further raised by an increased oxygen concentration. The total amount of oxygen is so calculated that the oxygen issuing from the liquid reactor is almost completely consumed in the subsequent off-gas purification. It is, of course, to be ensured that the oxygen content and the content of organic compounds in the gas, before and after an admixture of air, which is optionally carried out, upstream from the catalyst vessel, is chosen so that no explosive gas mixtures can form. The gas must be brought to the start temperature of the catalyst, for example to about 200° C., before entry into the oxidation zone. Catalysts in a fixed bed in a reaction tube are advantageously used for the catalytic after-oxidation, the reaction taking place substantially adiabatically so that the gas heats up during the reaction. The gas leaving the reactor consists essentially of nitrogen, oxygen, steam and carbon dioxide and is virtually completely free from organic compounds, nitrogen oxides and carbon monoxide.

A possible industrial carrying out of the process according to the invention is described with the aid of the FIGURE, only those parts of the process which is in itself known which are connected with the process according to the invention being described and diagrammatically represented.

In particular conventional devices for heating the installation before the start-up of the wet oxidation reaction and possible devices for external heat supply to the reactor during the wet oxidation, if for example the reaction of very dilute effluents is concerned, are not mentioned here.

The aqueous solution (13) containing organic compounds, for example an effluent, is treated in the reactor (1) with air which enters the reactor, together with condensate and steam, via (11). In the reactor, the oxidised liquid phase is separated from the off-gas. The liquid phase is discharged via (12), if appropriate after transferring the heat, via (43) and (44) in the heat exchanger (4), to the fresh feed which passes the heat exchanger via (41) and (42), or another utilisation of the energy, such as, for example, the production of steam for heating. The off-gas from the reaction, which contains, in addition to nitrogen and carbon dioxide, relatively large amounts of steam and organic constituents, is fed, via (50), to a preheater (5) in which it is warmed by about 5°-10° C. in order to avoid a condensation in the downstream catalyst bed (6). In order to purify the off-gas from undesired volatile compounds and/or entrained compounds, but in particular from troublesome inorganic compounds, it can be washed, downstream of the reactor, in an off-gas wash (10) with a suitable wash liquor, such as, for example, water (101). The wash solution can be recirculated into the reactor (1) via (102) or discharged via (103). The preheater (5) can be heated electrically, but also by means of the catalytically after-oxidised off-gas via (51) and (52) before this is fed via (60) to the catalyst (6), over which organic constituents which are still present are destroyed by oxidation. The purified off-gas enters the heat exchanger (2) via (20). There it gives up some of its heat, condensation simultaneously taking place. The amount of heat to be given up in the heat exchanger can be regulated by means of a by-pass (21).

The heat exchanger is connected, via (30), to a separator (3) in which the gaseous phase is separated from the liquid phase. The gaseous phase (70) can be fed, for further utilisation of the heat of reaction contained therein, for example, to a steam generator (7) and, for complete condensation, to an after-cooler (8) via (80). The condensate/gas mixture obtained in (7) and (8) is led via (90) to a separator (9) and separated there. The off-gas is let down via (91) and the liquid phase is led from the separator (3) to the liquid phase outlet (31) via (92). The combined condensate can be completely or partially discharged via (32). Usually, at least some of the condensate is fed via (33) and (24), and the fresh air via (23) and (29), to the heat exchanger (2), where at least some of the condensate evaporates and in this manner heat energy is recycled into the reactor via (11). Instead of the recycled condensate, fresh water can also be fed in, via (26). Alternatively, the fresh air can also be mixed directly with the condensate or fresh water via (23) and (28). The amount of heat transferred in the heat exchanger can be regulated by means of a by-pass (14).

Compared with known processes, the process according to the invention has the advantage that the wet oxidation of organic substances can be carried out in an economical manner under a significantly lower pressure even in the case of high concentrations. Reduced wall thicknesses of the high pressure apparatuses and reduced compression costs are typical characteristics of the process according to the invention.

A further advantage results from including a catalytic after-oxidation in the gaseous phase which, as is known, serves to remove organic compounds from off-gases by an oxidative path with the aid of catalysts. In connection with the variants known hitherto of wet oxidation processes, the catalytic after-oxidation makes possible, up to a certain degree, the additional removal of organic compounds from the off-gas.

However, surprisingly, a greater reduction in the organic constituents still remaining here in the effluent of more than 50% is achieved if the catalytic after-oxidation is used as part of the process according to the invention.

Substances which are difficult to oxidise are thereby also rapidly degraded so that higher rates of reaction and higher total conversions can be achieved.

EXAMPLE 1

A pilot plant, the arrangement of which was essentially similar to that described in FIG. 1, was used for the wet oxidation investigations. It consisted of the following positions: reactor (1), heat exchanger (2), phase separation vessel (3), heat exchanger (4), electrical preheater (5), catalyst tube (6), water-cooled condenser (8) and phase separation vessel (9).

The reactor (1) having a capacity of 15 l was fitted with a stirrer, thermometer and manometer and provided with electrical external heating which served to heat up the reactor when the installation was started up and only to compensate for heat loss by radiation in continuous operation. A tube-bundle heat exchanger with an internal surface area of 0.7 m² was used as the heat exchanger (2).

A 1.50 m long, heatable high-pressure tube of 2.5 cm internal diameter served as the catalyst tube (6). 600 ml of a palladium contact catalyst containing 18 g of Pd per 1 liter of γ-$Al_2O_3$ were chosen as the catalyst. The γ-$Al_2O_3$ beads, having an internal surface area of 260 m²/g and a diameter of 4 mm, with palladium are prepared analogously to Example 1 in DOS (German Published Specification) No. 2,436,368 by the alkaline reduction of a palladium chloride solution.

The wet oxidation reaction was carried out using the example of an effluent from a dyestuff-processing plant, which contained, in addition to relatively large amounts of salts, 4.5% by weight of dyestuffs with a calorific value of about 4,500 kcal/kg of dyestuff. The chemical oxygen demand (COD) of this effluent was 65 mg of $O_2$/g.

Air, which was supplied by a compressor via a reducing station, was employed as the oxygen-containing gas for the wet oxidation.

The effluent throughput was 10 l/hour. The stoichiometric air requirement, based on the COD value, was 2,188 standard liters/hour. 2,300 standard liters/hour were employed, which corresponds to an excess of 5% over the theoretical requirement. A reaction temperature of 330° C. was chosen and a reactor pressure of 145 bars. Since the partial pressure of water vapor ($P_w$) for the system is about 138 bars at 330°, the ratio of total pressure ($P_T$) to partial pressure of steam ($P_W$) is thus about 1.05.

To start the reaction, the reactor was initially filled with the effluent solution and the automatic pressure-maintaining valve in the off-gas line downstream of the phase separation vessel (9) was adjusted to the desired value. The contents of the reactor were heated approximately to the reaction temperature by the external heating and the product and air feed were then simultaneously and gradually increased to the abovementioned values, the reactor heating being reduced stepwise to a power which corresponded to the heat loss by radiation from the reactor. In order to avoid an increase in the reactor temperature to above 330° C., caused by too large a heat recycle from the heat exchanger (2), the by-pass line for this heat exchanger had to be opened a little. The heat exchange could be controlled via a regulating valve in this line so that the reaction temperature could be exactly maintained.

The off-gas, saturated with steam, streaming out of the reactor was prewarmed by 4° C. in the electrical preheater (5) before entry into the catalyst vessel (6). A further increase in temperature of, again, 4° C. occurred as a result of the after-oxidation, before the entry of the off-gas into the heat exchanger (2). In the steady state, the product inflow to the reactor, passing through the heat exchanger (4), was prewarmed to 296° C. by the product outflow.

The total amount of condensate which was led, according to FIG. 1, via line (31) and which was completely fed back to the reactor (1) via heat exchanger (2) was 36.4 kg/hour. This amount of water corresponds to a calorific value of 9,900 kcal, which was removed at an evaporation temperature of 330° C.

The following reaction results were obtained:

| | |
|---|---|
| Content of $O_2$ in the dry off-gas: | 1.1–1.5% |
| Conversion: | 98.3–98.7% |

EXAMPLE 2

As a comparison example, in a further experiment under conditions which were otherwise the same, the apparatus was modified so that the indirect heat exchanger (2) was by-passed. Thus the off-gas in this experiment was completely cooled in the after-condenser and the condensate was discharged at about 60° C.

When the apparatus was started up, a pressure of 250 bars was initially set. Under these conditions, the autoclave warmed up to beyond 330° C. as a result of the heat of reaction not being completely removed. In order to maintain the desired reaction temperature of 330° C., it was necessary to adjust the reactor pressure to 224 bars ($P_T$:$P_W$ = 1.6). The following results were achieved:

| | |
|---|---|
| $O_2$ in dry off-gas: | 1.7–2.3% |
| Conversion (according to COD): | 95.2–95.5% |

The increase in temperature at the contact catalyst was 3°–4° C.

EXAMPLE 3

Under the same conditions as described in Example 1, a further experiment was carried out in which only the catalyst tube (6) and the preheater (5) were omitted, so that the reaction was carried out without subsequent catalytic after-oxidation.

Under a pressure of 145 bars and with a closed by-pass round the heat exchanger, the temperature in the reactor sank to below 330° C. Only by increasing the pressure to 146 bars the following values were obtained at 330° C. under constant conditions:

| | |
|---|---|
| $O_2$ in dry off-gas: | 1.8–2.4% |
| Conversion (according to COD): | 94.8–95.3% |

EXAMPLE 4

A Li/Al/spinel contact catalyst which contained 9 g of Pt/l was employed under the same experimental conditions as described in Example 1. This contact catalyst was prepared analogously to Example 1 in DOS (German Published Specification) 2,436,368, using a platinum chloride solution.

The off-gas values and conversion were within the limits given in the 1st example; thus the contact catalyst behaved exactly as the palladium contact catalyst used.

EXAMPLE 5

A copper chromite contact catalyst was chosen as an oxidic contact catalyst. This consisted of a support (Macroport), which contained about 6% of copper, 6% of chromium oxide and 2% of barium. The by-pass (21) round the heat exchanger (2) had to be almost completely closed at 145 bars in order to achieve a temperature of 330° C. in the reactor. The following results were obtained under reaction conditions which were otherwise the same as those described in Example 1:

| | |
|---|---|
| O₂ in dry off-gas: | 1.5-1.9% |
| Conversion (according to COD): | 96.9-97.4% |

The temperature in the contact catalyst rose by 3° C.

EXAMPLE 6

A effluent heavily contaminated with organic compounds and having a COD value of 255 mg of $O_2/g$ (about 13.5% by weight of organic constituents) and a boric acid content of 4% by weight was employed under experimental conditions which were otherwise the same as those described in Example 1.

In order to retain the boric acid, which is volatile at elevated temperatures in the presence of steam, an off-gas washer (10), which the boric acid could be washed out of the off-gas by water, which was fed in, and recycled to the reactor via (102), was incorporated in the off-gas stream downstream of the reactor (1).

As a result of the significantly higher COD value and the air requirement which was thereby increased, a temperature in the reactor of 330° C. could not be maintained with the same heat exchanger. Only after increasing the pressure to 160 bars constant conditions were set up at a ratio $P_T:P_W = 1.2$ and a temperature of 330° C.:

| | |
|---|---|
| O₂ in dry off-gas: | 1.0-1.6% |
| Conversion (according to COD): | 98.5-98.8% |

The increase in temperature at the palladium contact catalyst was 5° C.

What is claimed is:

1. Process for the oxidation of organic substances, dissolved or dispersed in an aqueous system, with a gas containing molecular oxygen at elevated temperature and under elevated pressure chiefly to carbon dioxide and water, with subsequent phase separation of the reaction mixture into a gaseous phase substantially containing inert gas, carbon dioxide, steam and organic constituents and a liquid phase substantially containing water, characterized in that the pressure is adjusted, at the given temperature, so that the ratio of the total pressure ($P_t$) to the partial pressure of the steam in the reaction solution ($P_w$) is between 1.05 to 1.5 and so that by evaporation of water from the aqueous system, more steam than the exothermicity of the oxidation reaction gives rise to, goes into the aqueous phase, which is fed to a heat exchanger in which the amount of heat required to maintain the oxidation temperature is completely or partially transferred to a mixture of water and a gas containing molecular oxygen, which mixture flows in on the other side of the heat exchanger and is subsequently fed to the reactor.

2. Process according to claim 1, characterized in that for the mixture flowing in on the other side of the heat exchanger, the condensate obtained by the condensation of steam contained in the gaseous phase is used as the water and air is used as the gas containing molecular oxygen.

3. Process according to claim 1, characterized in that a total pressure is chosen which corresponds to the ratio of total pressure ($P_T$) to partial pressure of steam in the reaction solution ($P_W$) of $$P_T/P_W = 1.1 \text{ to } 1.3$$

4. Process according to claim 1, characterized in that the oxidation is carried out at a temperature of about 150° to 370° C.

5. Process according to claim 4 characterized in that the oxidation is carried out at a temperature of about 220°-350° C.

6. Process according to claim 1, characterized in that the gaseous phase is subjected to a downstream catalytic oxidation before entry into the heat exchanger.

7. Process according to claim 6, characterized in that the gaseous phase is passed over supported catalysts which contain metal oxides or a noble metal, in particular of the VIIIth sub-group of the periodic system.

8. Process according to claim 7, characterized in that aluminum oxide, corundum, alumina, porcelain, silicas, natural or synthetic silicates, quartz or titanium dioxide is used as the catalyst support.

9. Process according to claim 6, characterized in that palladium or platinum on γ-aluminum oxide or lithium-/aluminum/spinel is used as the noble metal.

10. Process according to claim 6, characterized in that the reaction is carried out under a pressure of about 5 to 325 bars and at a temperature of about 200° to 500° C.

11. Process according to claim 10, characterized in that the reaction is carried out under a pressure of about 20 to 210 bars and at a temperature of about 260° to 450° C.

12. Process according to claim 1, characterized in that the gaseous phase contains about 65-95% by volume of steam.

13. Process according to claim 12, characterized in that the gaseous phase contains about 75-90% by volume of steam.